(12) United States Patent
Liu et al.

(10) Patent No.: US 8,059,520 B2
(45) Date of Patent: Nov. 15, 2011

(54) DEVICE AND METHOD FOR AUTOMATICALLY TURNING OVER A DISC

(75) Inventors: Ming-Hsun Liu, Taipei (TW);
Chih-Sheng Liu, Taipei (TW);
Ching-Hao Chen, Taipei (TW);
Chia-Wei Hsu, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 487 days.

(21) Appl. No.: 12/344,239

(22) Filed: Dec. 25, 2008

(65) Prior Publication Data
US 2010/0169901 A1 Jul. 1, 2010

(51) Int. Cl.
*G11B 17/04* (2006.01)
(52) U.S. Cl. .................... 369/178.01; 369/199; 369/200
(58) Field of Classification Search ............ 369/178.01, 369/199, 200
See application file for complete search history.

(56) References Cited

U.S. PATENT DOCUMENTS

| | | | | |
|---|---|---|---|---|
| 4,123,066 | A * | 10/1978 | Minemura et al. | 369/200 |
| 4,447,900 | A * | 5/1984 | Schatteman et al. | 369/200 |
| 4,466,028 | A * | 8/1984 | Ayukawa | 369/200 |
| 7,913,267 | B2 * | 3/2011 | Liu et al. | 369/200 |

* cited by examiner

Primary Examiner — Trong Phan (57) ABSTRACT

A device and a method for automatically turning over a disc relate to a guide rod provided with a movable member. The movable member is assembled to a rotating member via a pivot member in such a manner that the movable member can axially move along and radially rotate around the guide rod. The pivot member is disposed between the movable member and the rotating member and powered to rotate. The rotating member is provided with a disc-carrying device in a direction of its rotation around the pivot member for taking the disc. The pivot member drives the disc to rotate via the rotating member, so as to turn over the disc, so that the rotating member makes the disc slide down into the tray in an inclined manner.

7 Claims, 10 Drawing Sheets

DEVICE AND METHOD FOR AUTOMATICALLY TURNING OVER A DISC

BACKGROUND OF THE INVENTION

1. Field of the Invention

The present invention relates to a device and a method for automatically turning over a disc, which is applied in a data-burning/printing process for automatically turning over a disc to burn or to print data in both sides of the disc.

2. Description of the Prior Art

Conventionally, the disc turn-over technology is applied in two kinds of disc-recording processes: one is the production of the double-sided discs, namely both sides of the disc can be stored with data, and the other is the production of the light-printing (Light Scribe/Label Flash) discs, namely one side of the disc is stored with data, and the other side of the disc is provided for laser etched labels with text or graphics.

However, a common automatic duplication system is only applicable in a single-sided burning/copying process and its robotic arm can move up and down along an axis. When reaching a specific height (normally above the tray of the duplication system), the robotic arm can horizontally rotate. The robotic arm performs the following operations during the duplication process:

1. The arm rotates to the zone A and then will vertically move to pick up a blank disc;
2. The arm will vertically move together with the blank disc to the height above the tray of the duplication system;
3. The arm will rotate together with the blank disc to the zone B above the tray;
4. The arm will vertically move within the zone B to load the blank disc on the tray for performing the burning operation;
5. After the burning of the blank disc, the disc will vertically move to pick up the burned disc; and
6. The arm will rotate to the zone C together with the burned disc, and then will unload the burned disc.

Subsequently, the steps 1-6 will be repeated over and over again, so that the automatic duplication of the single sided burning/printing can be performed continually.

Please refer to U.S. Pat. No. 6,141,298, entitled "PROGRAMMABLE SELF-OPERATING COMPACT DISC DUPLICATION SYSTEM", the system includes a pivotal transport tower 58 provided with a disk suction pickup unit 54, the disk suction pickup unit 54 can be ascended and descended to move the disc between the respective stacked disk drive receptacle members 82 and the respective disk-collecting pillars 50, 52a, 52b to perform the burning of the blank disk and then collecting the finished disk. Although such a structure can perform the disc-changing operation, it cannot perform the disc-turning operation, namely the discs are also manually or with an extra device turned over with a specific period. In addition, it is to be noted that there is no machine capable of performing both disc-turning and disc-changing operations in the present market.

Currently, there are mainly two conventional methods for turning a disc over:

1. The first method is to manually turn over the stacked discs of the zone C (one side of these stacked discs has been burned) wholly and then move them to the zone A for repeating the steps 1-6;
2. The second method is to add an extra turn-over mechanism in the zone C to turn over the discs one by one, and then make use of the robotic arm to pick up the turned discs on the zone C and repeat the steps 2-5 and finally rotate the arm to unload the both sides finished discs on the zone D.

The above conventional disc-recording processes require applying the turn-over technology and actually suffer from many disadvantages such as:

1. The robotic arm can only move up and down and rotate horizontally, and the conventional duplication system needs providing an extra turn-over mechanism to turn over the discs, thus causing high equipment cost;
2. The processes of taking out, turning over and taking back the disc takes lots of time, thus greatly increasing the working time of the duplication system;
3. The conventional duplication system must provide an extra zone D for the both sides finished discs, thus causing the vain space waste.

SUMMARY OF THE INVENTION

The technical problems to be solved:

The conventional devices for automatic duplication system almost utilize the robotic arms to take the semi-finished disc products out of the tray of burning/printing device and then utilize an extra disc turn-over device to turn over the discs, and finally utilize the robotic arms again to load the discs back to the tray of the burning/printing device for next duplication process. Therefore, the conventional devices for automatic duplication system suffer from the following disadvantages: the operation of taking out, turning over and taking back the semi-finished discs takes lots of time, and the extra disc turn-over device occupies lots of space and costs lots of money, not applicable to the burning/printing device whose disc groove isn't exposed outside completely, and the disc turn-over and disc-changing operations cannot be performed synchronously by the same equipment.

In order to solve the above technical problems, the present invention provides a device and a method for automatically turning over a disc. The device for automatically turning over a disc comprises a guide rod, a movable member, a pivot member and a rotating member. The guide rod is provided for placement of the movable member in such a manner that the movable member moves along and rotates around the guide rod. The movable member is movably disposed on the guide rod. The pivot member is disposed is disposed between the movable member and the rotating member and powered to rotate. The rotating member is connected to the movable member via the pivot member and driven to rotate around the pivot member, and the rotating member is provided with a disc-carrying device in a direction of its rotation around the pivot member for taking a disc.

Hence, when a disc is placed into the tray of an optical burning/printing device for executing a burning/printing operation, the movable member will be moved to a position higher than the extending position of the tray. After one side of the disc is burned, the tray will deliver the disc out of the optical burning/printing device. Subsequently, the movable member together with the rotating member will be descended to reach the disc, and then the rotating member will be ascended after the disc-carrying device takes the disc. After that, the pivot member is used to drive the rotating member with the disc to rotate, so as to turn over the disc at an inclined angle in such a manner that before the disc-carrying device releases the disc, the disc will slide down into the tray. While the movable member rotates to drive the rotating member move away from the upper position of the tray, the disc is turned over and completely falls off into the disc groove.

The present invention provides the following functions:

1. The primary objective of the present invention is to provide a device and a method for automatically turning over a disc, which can turn over a disc quickly and conveniently and can load and unload a disc besides turning over a disc through the cooperation of the guide rod, movable member, pivot member and the rotating member.

2. The secondary objective of the present invention is to provide a device and a method for automatically turning over a disc, the device of which mainly occupies the space in the vertical direction of the moving space of the tray, in other words, shares the space of the tray, and has a smaller volume, thus saving space and improving space utilization.

3. The third objective of the present invention is to provide a device and a method for automatically turning over a disc, the device of which has a simple structure comprising a guide rod, a movable member, a pivot member and a rotating member that are easily fabricated and inexpensive, thus greatly reducing the equipment cost.

4. The forth objective of the present invention is to provide a device and a method for automatically turning over a disc, the rotation of the guide rod of which can be stopped at any angle, so that the disc-turning, disc-changing, disc-loading and disc-taking operations can be performed at any angle, thus improving the agility in use and widening the application range.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
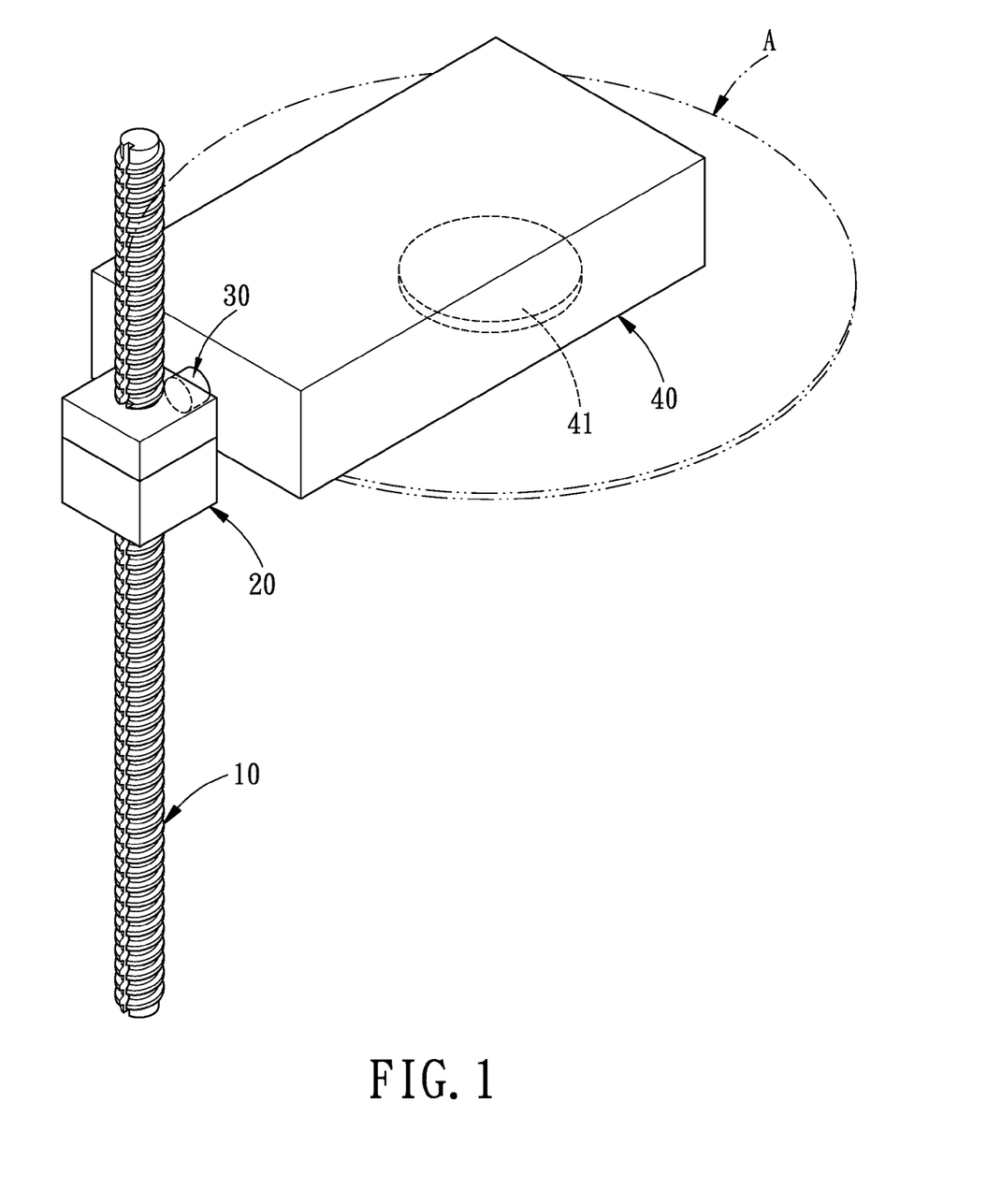
FIG. 1 is a perspective view of a device for automatically turning over a disc in accordance with the present invention.
Figure 2:
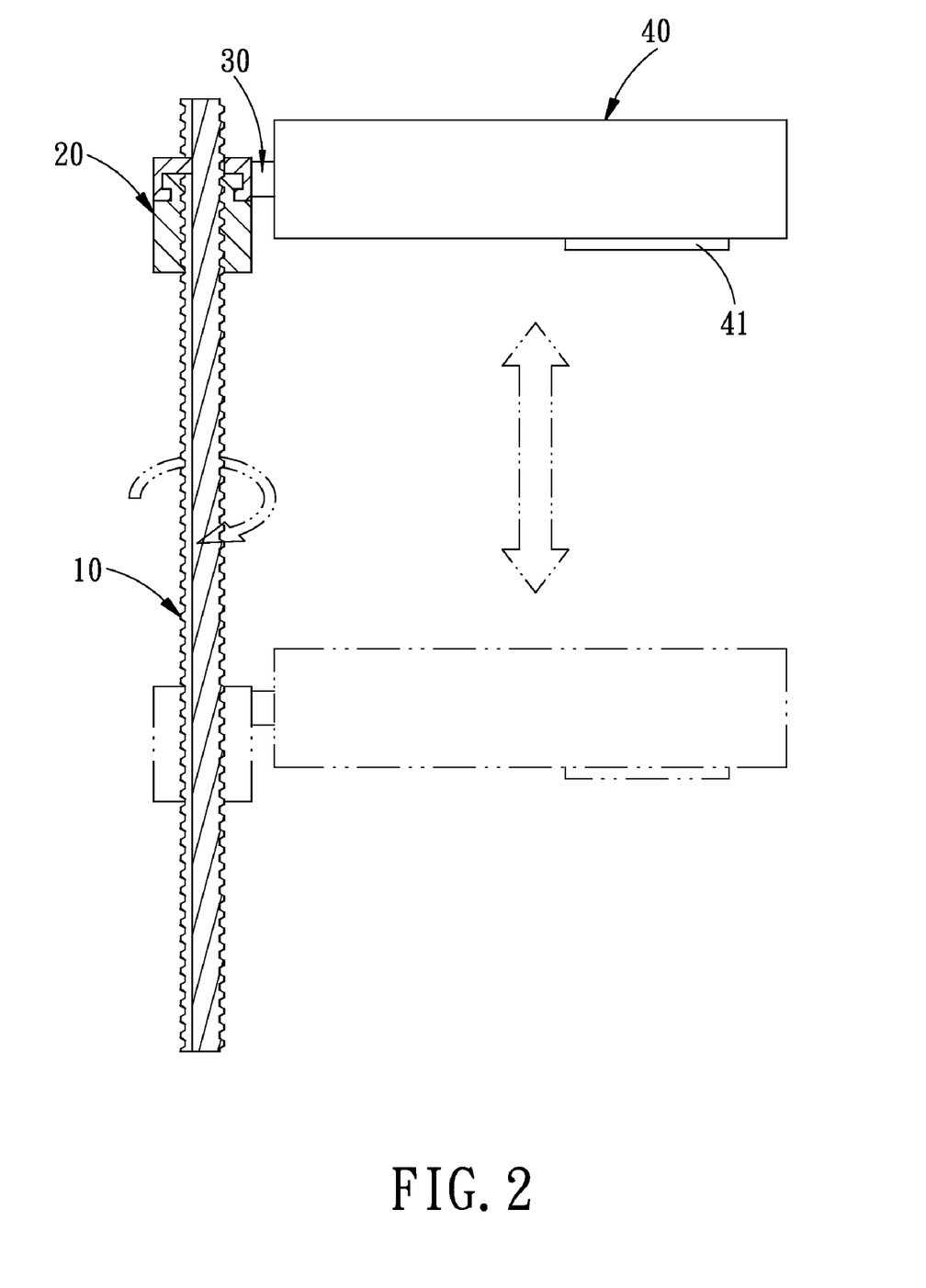
FIG. 2 illustrates how a movable member moves along a guide rod in accordance with the present invention.
Figure 3:
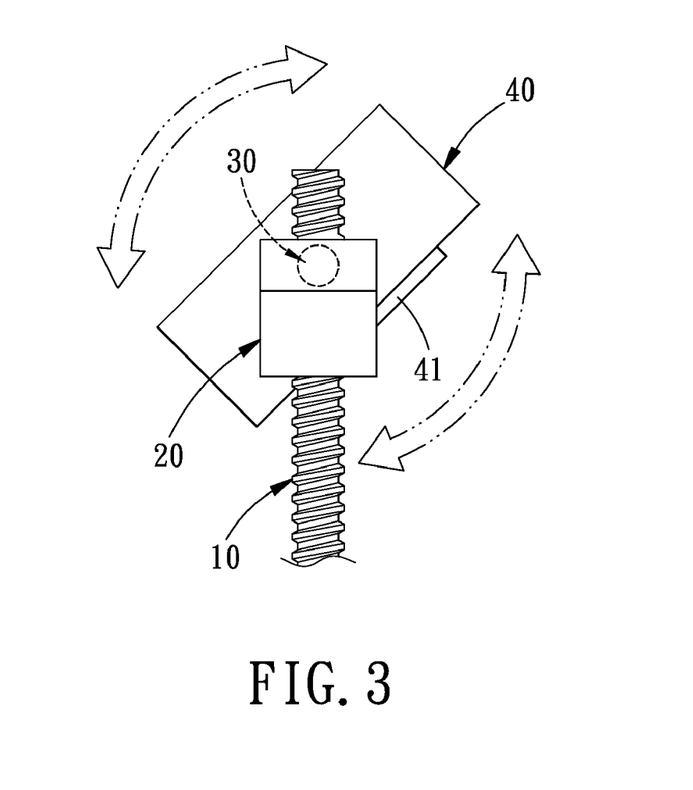
FIG. 3 is a schematic view illustrating the rotation of rotating member in accordance with the present invention.

Referring to FIGS. 1-3, a device for automatically turning over a disc in accordance with a preferred embodiment of the present invention comprises a guide rod 10, a movable member 20, a pivot member 30 and a rotating member 40.

The guide rod 10 of the embodiment is in the form of a screw shaft and provided for placement of the movable member 20 in such a manner that the movable member 20 can move axially along and rotate radially around the guide rod 10, as shown in FIG. 2.

The movable member 20 is disposed on the guide rod 10 and can be driven to move along it. The movable member 20 of the embodiment is provided with a threaded hole to be engaged with the guide rod 10 in the form of the screw shaft. The movable member 20 moves along the guide rod 10 while its radial rotation around the guide rod 10 is restricted.

The pivot member 30 is disposed on the movable member 20 and powered to rotate, as shown in FIG. 3.

The rotating member 40 is connected to the movable member 20 via the pivot member 30, and can rotate around the pivot member 30. The rotating member 40 is provided with a disc-carrying device 41 in a direction of its rotation around the pivot member 30 for taking a disc A.

Figure 4:
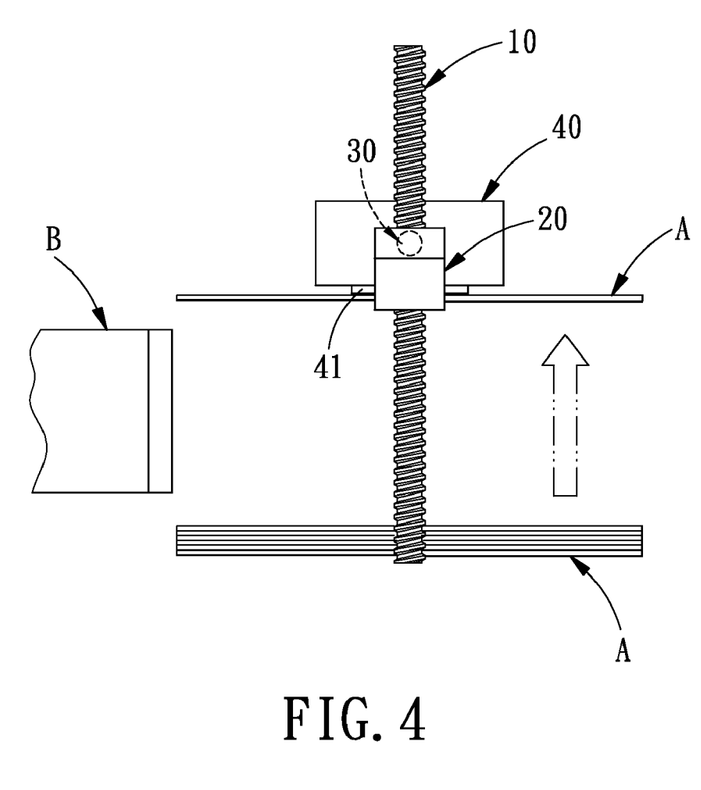
FIG. 4 illustrates that the device for automatically turning over a disc takes a disc in accordance with the present invention.
Figure 5:
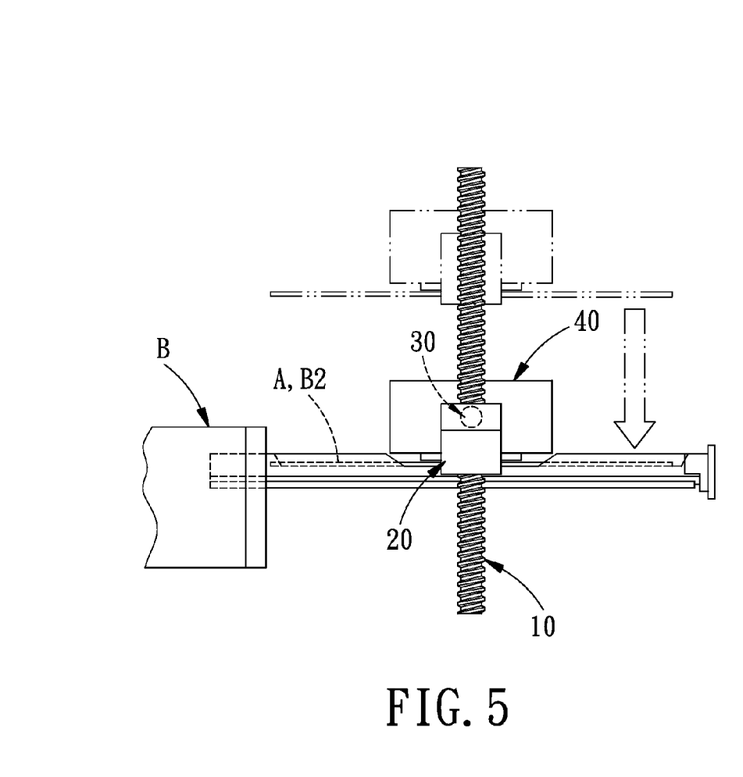
FIG. 5 illustrates that the device for automatically turning over a disc in accordance with the present invention loads the taken disc in a tray.

FIGS. 4-5 show how the device for automatically turning over a disc in accordance with the present invention automatically loads a disc. First referring to FIG. 4, the device for automatically turning over a disc is located in front of the tray B1 of an optical burning/printing device B and the tray B1 hasn't been extended out of the optical burning/printing device B, at this moment, the movable member 20 descends to make the rotating member 40 move close to a disc A and takes it with the disc-carrying device 41, and then the movable member 20 will drive the rotating member 40 and the disc A to ascend until it reaches a position higher than the position where the tray B1 extends out of the optical burning/printing device B. Further referring to FIG. 5, following that, the tray B1 will extend out of the optical burning/printing device B, the movable member 20 will descend again with the rotating member 40 until the disc A is located in the disc groove B2 of the tray B1, and then the movable member 20 will be ascended again after the disc-carrying device 41 releases the disc A, so that the tray B1 can deliver the disc A into the optical burning/printing device B for executing the burning/printing operation. The above method is applicable when the disc groove B2 is exposed out of the optical burning/printing device B completely.

Figure 6:
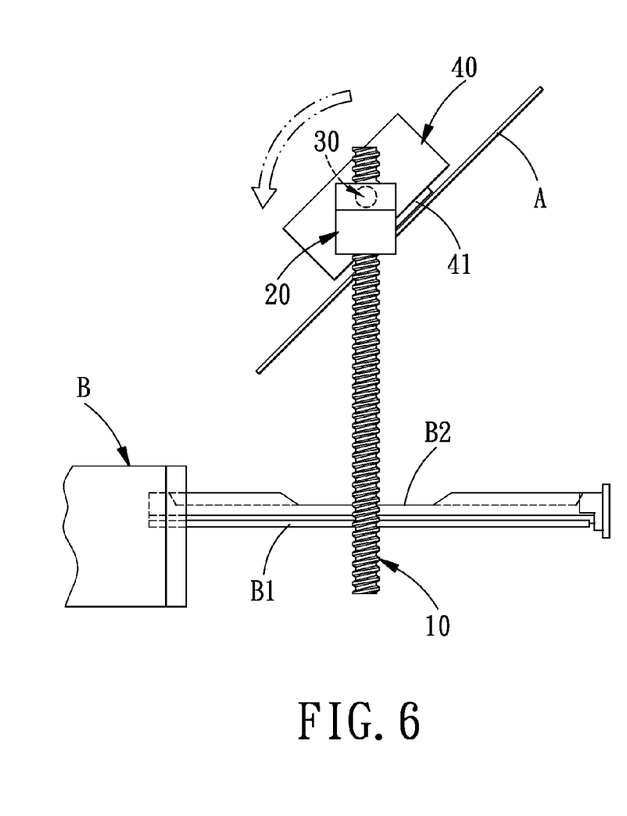
FIG. 6 illustrates that the device for automatically turning over a disc in accordance with the present invention takes the disc and is ready to load the disc in an inclined manner.
Figure 7:
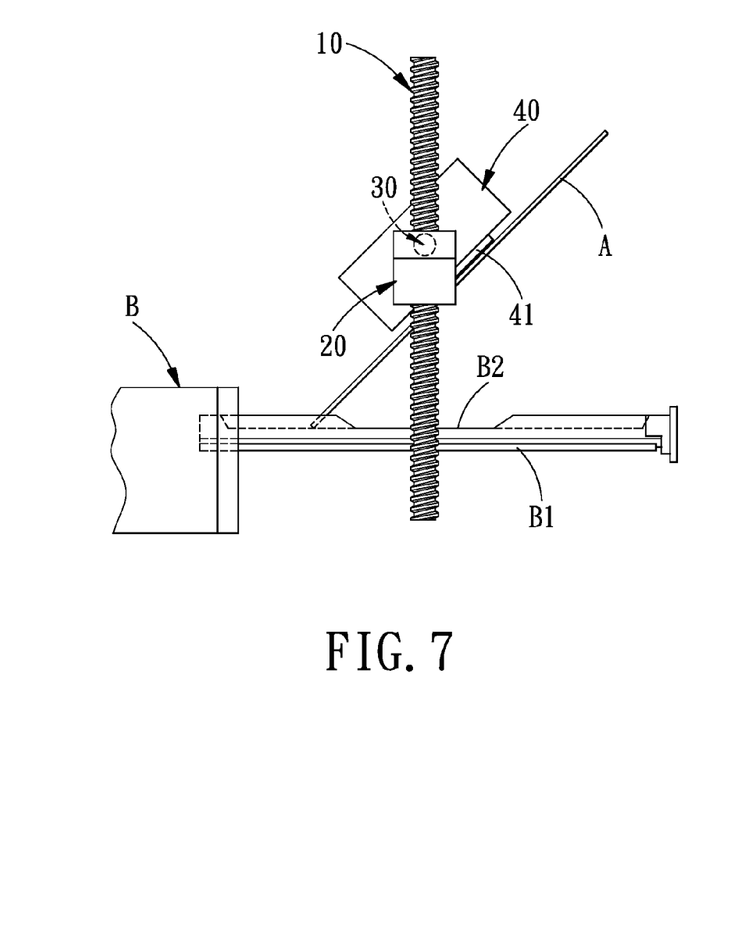
FIG. 7 illustrates that the device for automatically turning over a disc in accordance with the present invention loads the disc in an inclined manner.
Figure 8:
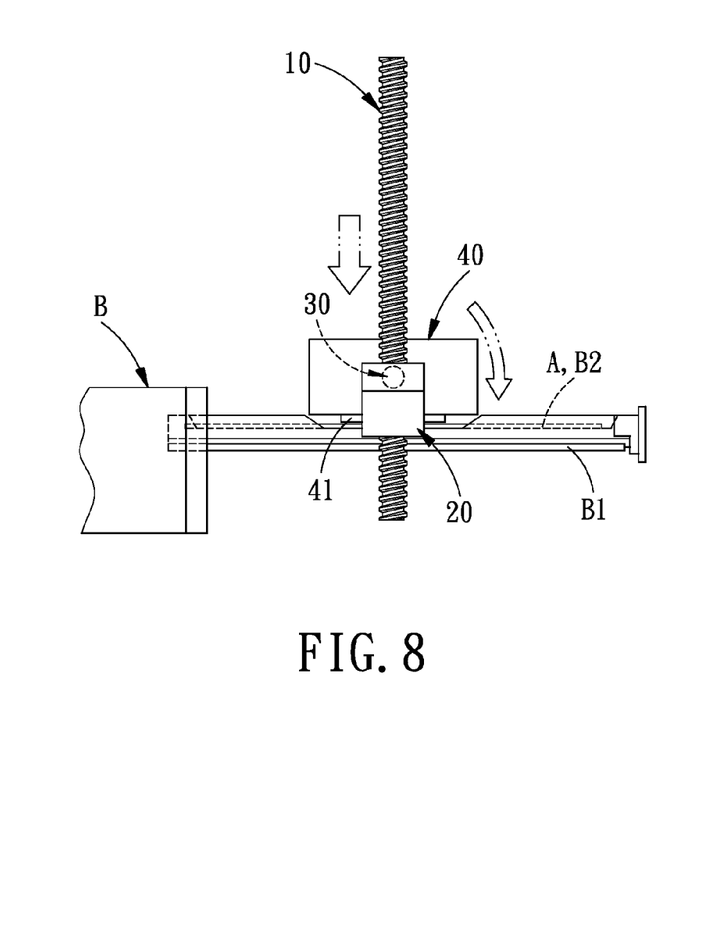
FIG. 8 illustrates that the taken disc has been loaded in the inclined manner already in accordance with the present invention.

FIGS. 6-8 show how the device for automatically turning over a disc in accordance with the present invention automatically loads disc in a disc groove B2 which is not completely exposed out of the optical burning/printing device B. Referring to FIG. 6 first, the device for automatically turning over a disc in accordance with the present invention is located in front of the tray B1 of the optical burning/printing device B, and the disc groove B2 hasn't been completely extended out of the optical burning/printing device B, at this moment, the movable member 20 will descend to use the disc-carrying device 41 of the rotating member 40 to take a disc A, and then the movable member 20 will be ascended with the rotating member 40 until the disc A reaches a position higher than the tray B1, meanwhile, the rotating member 40 with the help of the pivot member 30 will rotate the disc A at a predetermined angle in such a manner that one border of the disc A, which is located closer to the optical burning/printing device B is lower than the other border of the disc A which is located farther from the optical burning/printing device B, as shown in FIG. 6. Subsequently, as shown in FIG. 7, when the lower border of the disc A is close to the disc groove B2 of the tray B1, the rotating member 40 with the help of the pivot member 30 will rotate to make the disc A gradually lie flat in such a manner that the lower border of the disc A slantways extends into the disc groove B2. As shown in 8, when the disc A is aligned with the disc groove B2, the disc-carrying device 41 will release the disc A, so as to allow the tray B1 to deliver the disc A into the optical burning/printing device B for executing the burning/printing operation.

Figure 9:
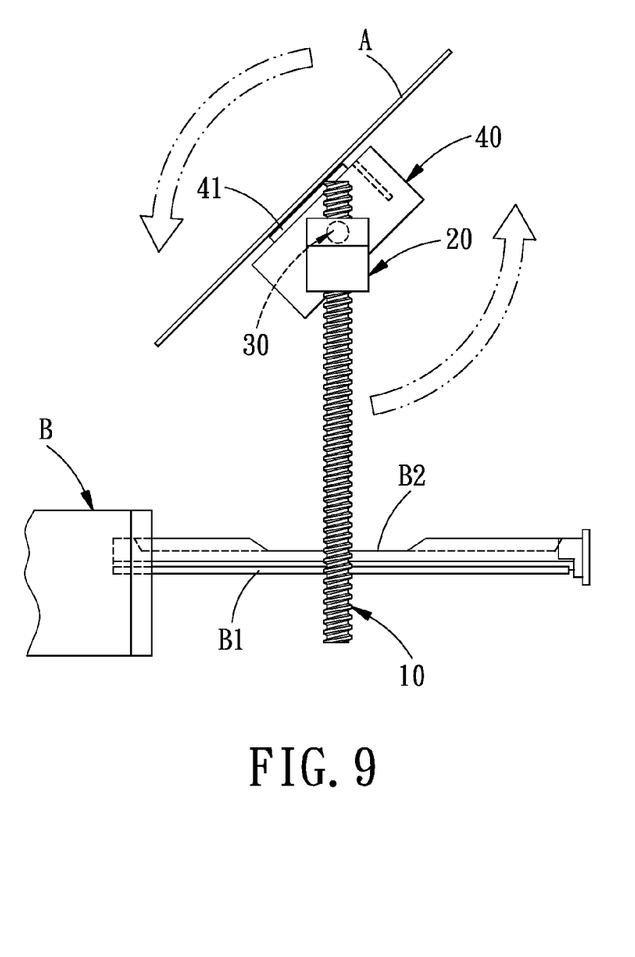
FIG. 9 illustrates that the device for automatically turning over a disc in accordance with the present invention takes the disc and turns the disc over.
Figure 10:
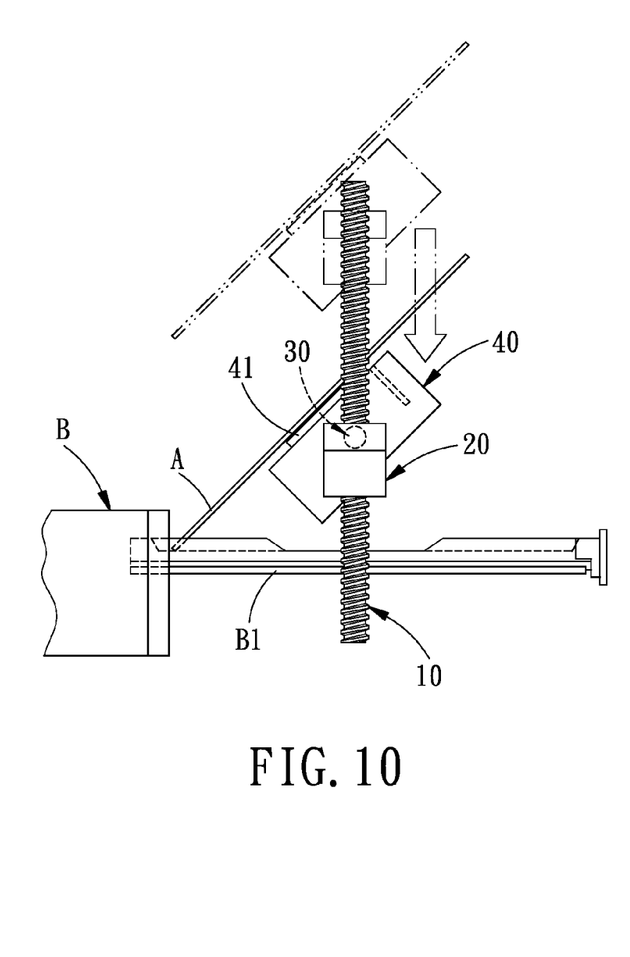
FIG. 10 illustrates how the disc is loaded after being turning over in accordance with the present invention.
Figure 11:
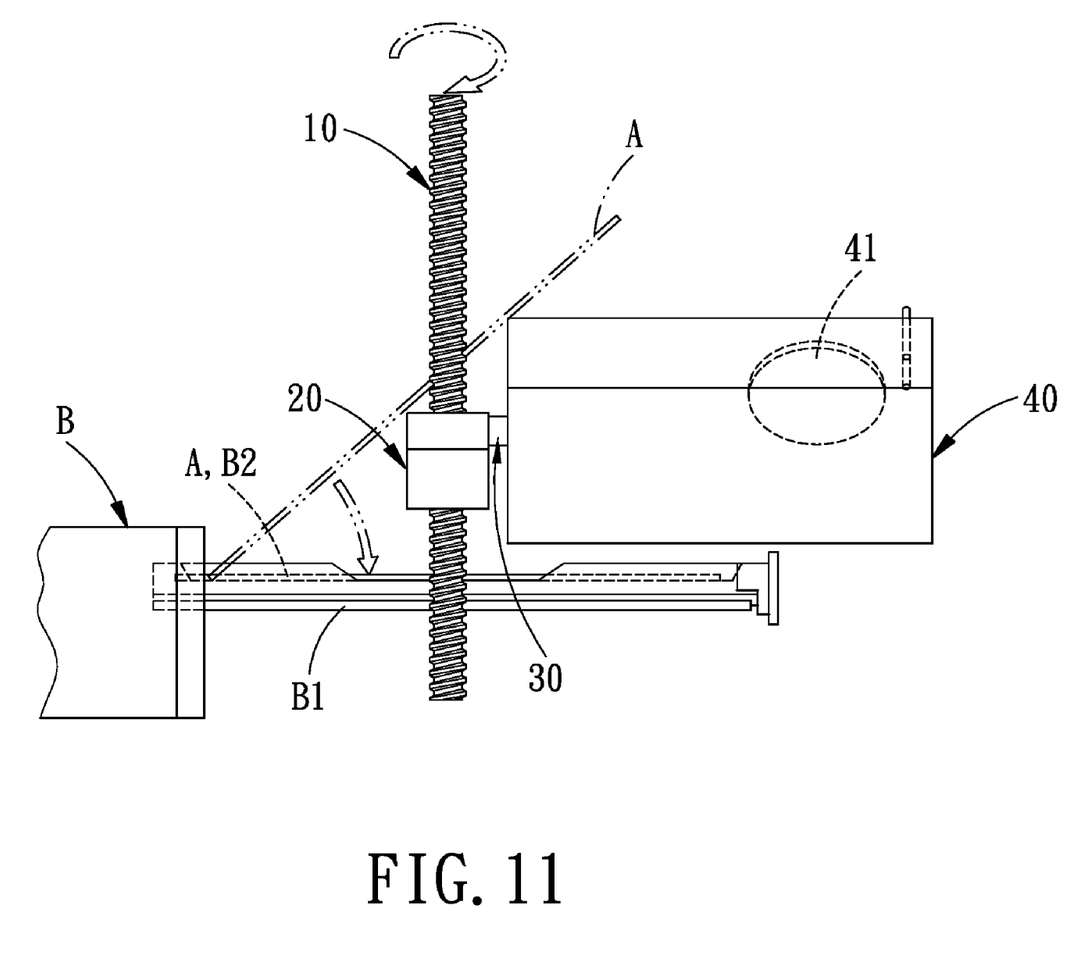
FIG. 11 illustrates the disc, which has been taken and turned over, has been already loaded in accordance with present invention.

Further referring to FIGS. 9-11, which show how the device for automatically turning over a disc in accordance with the present invention turns over a disc, after one side of the disc A is burned, the tray B1 will deliver the disc A out of the optical burning/printing device B, at this moment, the movable member 20 of the device for automatically turning over a disc is located at a position higher than the position where the tray B1 extends out of the optical burning/printing device B, next, the movable member 20 and the rotating member 40 will be descended synchronously. After the disc-carrying device 41 of the rotating member 40 takes the disc A, the rotating member 40 will be ascended, meanwhile, the rotating member 40 with the help of the pivot member 30 drives the disc A to rotate at an predetermined angle, as shown in FIG. 9, so that the disc A will be turned over, after the disc is turned over, one border of the disc A, which is located closer to the optical burning/printing device B, is lower than the other border of the disc A, which is farther from the optical burning/printing device B. Subsequently, the disc-carrying device 41 will release the disc A, so that the disc A will slide down into the tray B1 in an inclined manner, as shown in FIG. 10. Following that, further referring to FIG. 11, the movable member 20 will be radially rotated around the guide rod 10 to make the rotating member 40 move away from the upper position of the tray B1, so that the disc A can fall off into the disc groove B2 completely. The device for automatically turning over a disc in accordance with the present invention is applicable when the disc groove B2 is completely exposed out of the optical burning/printing device B or a small part of the disc groove B2 is still located in the optical burning/printing device B.

Figure 12:
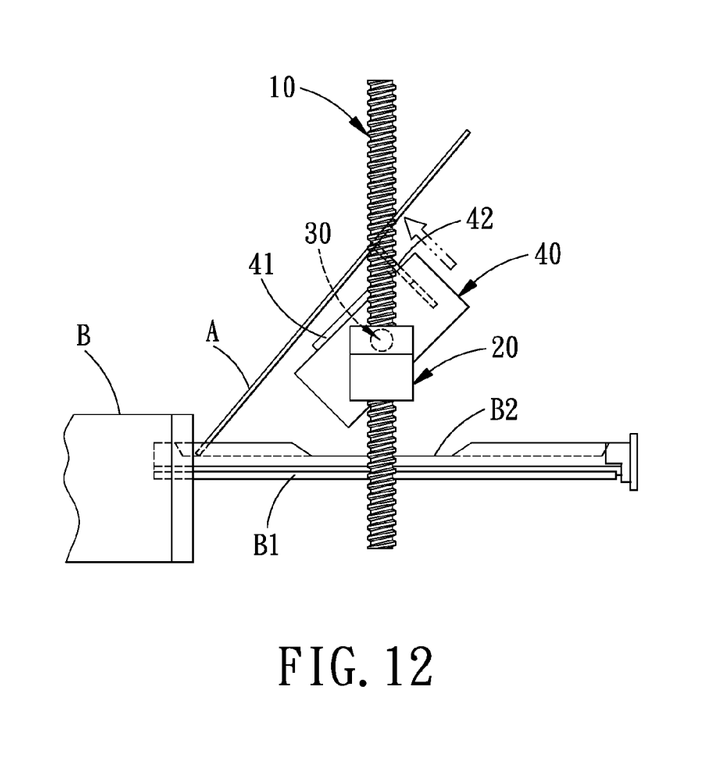
FIG. 12 illustrates that a push rod in accordance with the present invention is used to load the disc.

Additionally, as shown in FIG. 12, the rotating member 40 is further provided with an extendable push rod 42 in the same direction where the disc-carrying device 41 is disposed. The push rod 42 can extend to increase the inclined angle of the disc A to reduce the friction for facilitating the slide-down of the disc A. When the rotating member 40 utilizes the disc-carrying device 41 to take the disc A and rotates with the help of the pivot member 30 at an inclined angle, the disc-carrying device 41 will release the disc A and then extend the push rod 42 to push against the disc A at an increased inclined angle, so that the disc A can easily slide down into the tray B1 along the inclined angle. After that, the movable member 20 will be radially rotated around the guide rod 10 to make the rotating member 40 move away from the upper position of the tray B1, so that the disc A will fall off into the disc groove B2 completely, thus finishing the operation of turning over a disc.

Figure 13:
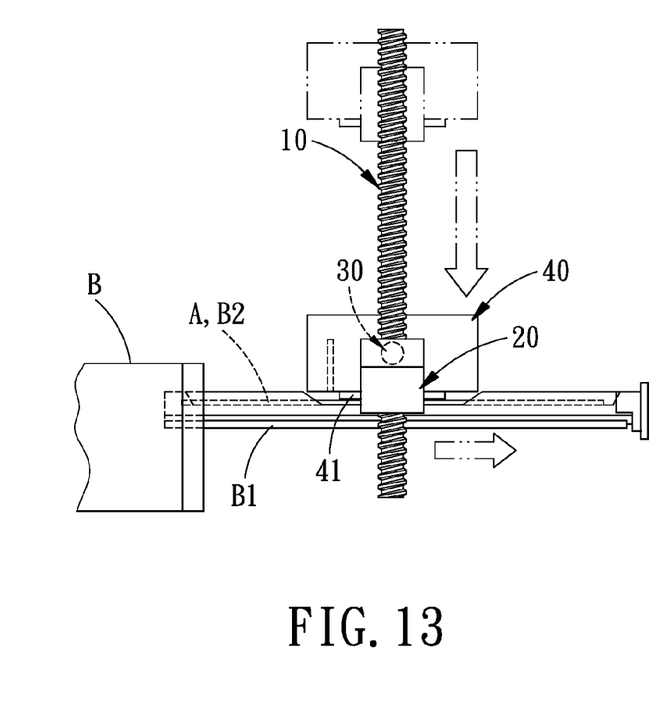
FIG. 13 illustrates how the device for automatically turning over a disc in accordance with the present invention delivers the disc out of an optical burning/printing device and unloads the disc.

After the burning/printing operation of the other side of the disc A is finished, the tray B1 will deliver the disc A out of the optical burning/printing device B to make the disc A locate below the rotating member 40. Subsequently, the movable member 20 and the rotating member 40 will be descended synchronously, so that the rotating member 40 will move close to the disc A and utilize the disc-carrying device 41 to take the disc A, as shown in FIG. 13, after that, the movable member 20 will drive the rotating member 40 with the disc A to ascend, and the tray B1 will retract into the optical burning/printing device B, so that the movable member 20 can descend to unload the disc A.

Figure 14:
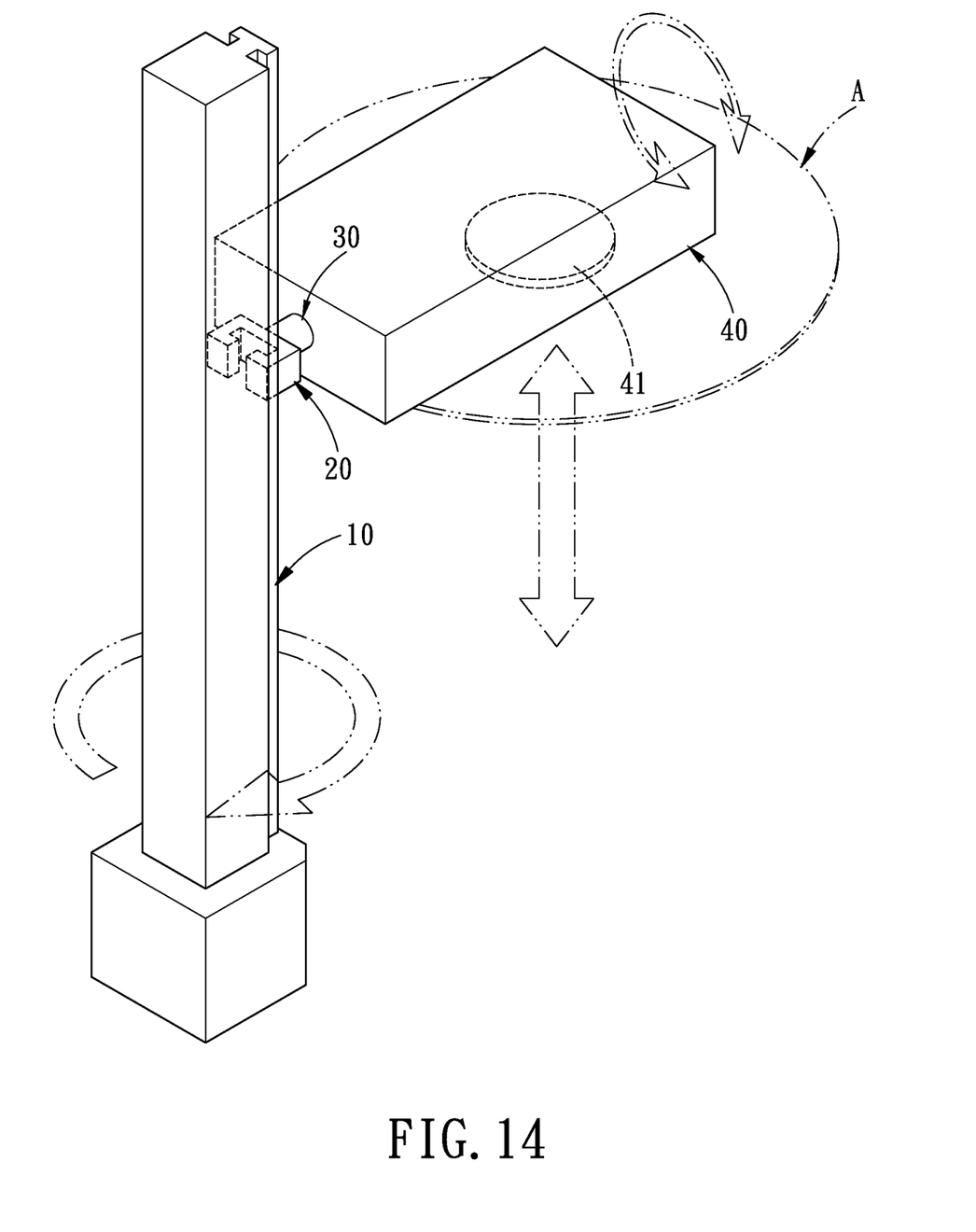
FIG. 14 is a perspective view illustrating that the guide rod in accordance with the present invention is in the form of a slide rail.
Figure 15:
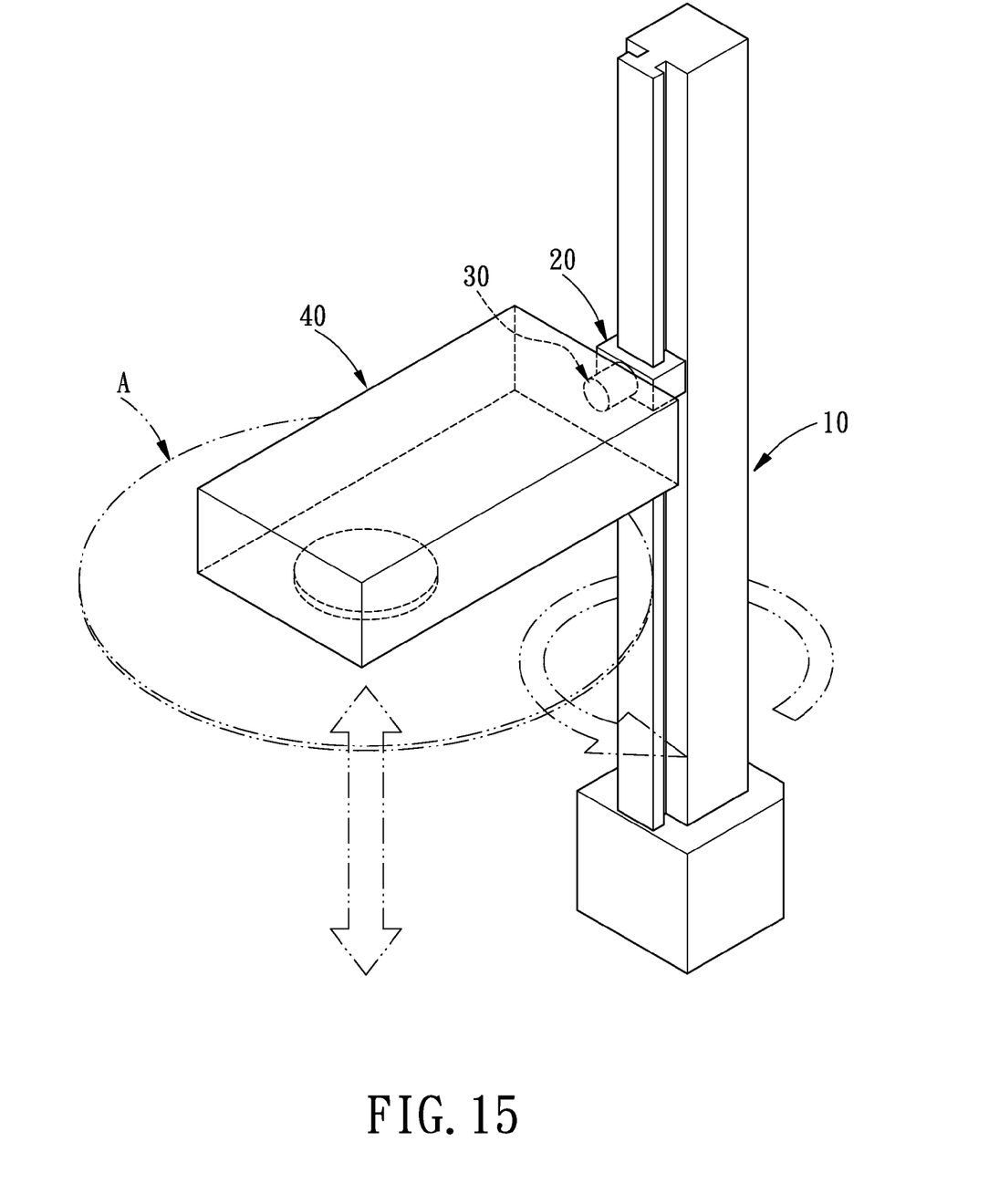
FIG. 15 is a perspective view illustrating that the guide rod of the present invention is in the form of a slide rail.

Besides the screw shaft, the guide rod 10 can also be in the form of a slide rail to provide the same function, and the slide rail is wholly disposed on a drive device for controlling rotation as shown in FIGS. 14 and 15.

The rotating member 40 with the movable member 20 move along the guide rod 10 while the guide rod 10 is fixed, or the rotating member 40 and the movable member 20 rotates radially together with the guide rod 10.

The method for automatically turning over a disc in accordance with the present invention is realized through cooperation of a guide rod 10, a movable member 20, a pivot member 30 and a rotating member 40 and comprises the steps of:

1. loading a disc A on a tray B1 of an optical burning/printing device B for executing a burning/printing operation;

2. moving the movable member 20 with the rotating member 40 to a position higher than an extending position of the tray B1;

3. delivering the disc A, one side of which has been burned, out of the optical burning/printing device B via the tray B1 in such a manner that the disc A is rightly located below the rotating member 40;

4. controlling the movable member 20 to descend synchronously with the rotating member 40, and then controlling the movable member 20 to ascend synchronously with the rotating member 40 after a disc-carrying device 41 of the rotating member 40 takes the disc A;

5. using the pivot member 30 to drive the rotating member 40 to rotate the disc A, so as to turn over the disc A, after the disc A is turned over, the disc A is in an inclined state, and one border of the disc A, which is located closer to the optical burning/printing device B, is lower than the other side of the disc A;

6. releasing the disc A from the disc-carrying device 41, so that the disc A slides down along the inclined angle and falls off into the tray B1;

7. making the movable member 20 drive the rotating member 40 to horizontally move away from the upper position of the tray B1, so that the disc A can fall off in the disc groove B2 completely; and 8. using the tray B1 to deliver the disc A, which has been turned over, into the optical burning/printing device B for executing further operation such as burning, optical printing or laser marking.

With the above structure, the present invention has the following advantages:

1. Less time consuming: after the rotating member 40 takes the disc A, the movable member 20 and the rotating member 40 will be ascended, then the pivot member 30 is directly used to turn over the disc A, and finally the disc A will slide down into the tray B1, therefore, the process of turning over a disc is convenient and quick, the rotating member 40 of the present invention itself can rotate 360 degrees so as to directly turn over the disc, and the disc-turning, disc-changing, disc-loading and disc-taking operations can be performed by the same device, thus achieving the objectives of convenient to use and wide applications, in addition, the upward, downward movements, the horizontal rotation and the 360-degree rotation can be directly realized, thus avoiding many unnecessary operations and saving time.

2. Occupying less space: the device for automatically turning over a disc mainly occupies the space in the vertical direction of the moving space of the tray B1 and has a small volume, so that the space occupied by the device for automatically turning over a disc overlaps with the tray B1, thus saving space.

3. The present invention has a small number of components, and the guide rod 10, the movable member 20, the pivot member 30 and the rotating member 40 are all easy to fabricate, thus having the advantages such as low purchase cost and greatly reducing the equipment cost, etc.

4. The rotation of the rotating member 40 can be stopped at any angle, so that the disc-turning, disc-changing, disc-loading and disc-taking operations can be performed at any angle, thus improving the agility in use and widening the application range.

While we have shown and described various embodiments in accordance with the present invention, it is clear to those skilled in the art that further embodiments may be made without departing from the scope of the present invention.

What is claimed is:

1. A device for automatically turning over a disc, comprising a guide rod, a movable member, a pivot member and a rotating member; wherein:

the guide rod is provided for placement of the movable member in such a manner that the movable member axially moves along and radially rotates around the guide rod;

the movable member is movably disposed on the guide rod;

the pivot member is disposed on the movable member and powered to rotate;

the rotating member is connected to the movable member via the pivot member, and the rotating member rotates around the pivot member and is provided with a disc-fetching device in a direction of its rotation around the pivot member for absorbing a disc.

2. The device for automatically turning over a disc as claimed in claim 1, wherein the guide rod is in the form a screw shaft, and the movable member is provided with a threaded hole to be engaged with the screw shaft.

3. The device for automatically turning over a disc as claimed in claim 1, wherein the guide rod is in the form of a slide rail.

4. The device for automatically turning over a disc as claimed in claim 1, wherein the movable member rotates around the guide rod by itself or driven by the guide rod to rotate synchronously with the guide rod.

5. The device for automatically turning over a disc as claimed in claim 1, wherein the movable member axially moves along the guide rod while its radial rotation around the guide rod is restricted.

6. The device for automatically turning over a disc as claimed in claim 1, wherein the rotating member is provided with an extendable push rod in the same direction where the disc-fetching device is disposed, when the rotating member utilizes the disc-fetching device to absorb the disc and then rotates at an inclined angle, the disc-fetching device will release the disc, and then the push rod will extend to push the disc to make the disc fall off into a disc groove.

7. A method for automatically turning over a disc, used in cooperation with the device as claimed in claim 1, comprising the steps of:

loading a disc on a tray of a rewriter for carrying out a burning operation;

moving the movable member to a position higher than an extending position of the tray;

delivering the disc, one side of which has been burned, out of the rewriter via the tray in such a manner that the disc is rightly located below the rotating member;

using the movable member to control the rotating member to descend synchronously with the movable member, and then control the rotating member to ascend synchronously with the movable member after a disc-fetching device of the rotating member absorbs the disc;

using the pivot member to drive the rotating member to rotate the disc, so as to turn over the disc, after the disc is turned over, the disc will be in an inclined state, and one side of the disc, which is located closer to the rewriter, is lower than the other side of the disc;

releasing the disc from the disc-fetching device, so that the disc slides down along the inclined angle and falls off into the tray;

making the movable member rotate around the guide rod to drive the rotating member to move away from the upper position of the tray, so that the disc falls off in a disc groove completely; and using the tray to deliver the disc, which has been turned over, into the rewriter for carrying out further operation such as burning, optical printing or laser marking.

\* \* \* \* \*